US012479215B2

(12) United States Patent
Breazeale et al.

(10) Patent No.: US 12,479,215 B2
(45) Date of Patent: Nov. 25, 2025

(54) INKJET PRINTER WITH ADDITIONAL ADHESIVE JET

(71) Applicant: Cobra Flex Printers LLC, Tempe, AZ (US)

(72) Inventors: Christopher D. Breazeale, Gilbert, AZ (US); James M. Lemmer, Apache Junction, AZ (US)

(73) Assignee: Cobra Flex Printers LLC, Tempe, AZ (US)

( * ) Notice: Subject to any disclaimer, the term of this patent is extended or adjusted under 35 U.S.C. 154(b) by 0 days.

(21) Appl. No.: 19/023,023

(22) Filed: Jan. 15, 2025

(65) Prior Publication Data

US 2025/0153488 A1 May 15, 2025

Related U.S. Application Data

(63) Continuation-in-part of application No. 18/831,035, filed on May 8, 2024, and a continuation-in-part of application No. 18/445,939, filed on Apr. 4, 2024, and a continuation-in-part of application No. 18/445,941, filed on Apr. 4, 2024, and a continuation-in-part of application No. 18/445,443, filed on Aug. 21, 2023, now abandoned.

(60) Provisional application No. 63/474,551, filed on Aug. 22, 2022.

(51) Int. Cl.

| | |
|---|---|
| ***B41J 3/407*** | (2006.01) |
| ***B41J 2/21*** | (2006.01) |
| ***B41J 11/00*** | (2006.01) |

(52) U.S. Cl.

CPC ........... *B41J 3/4078* (2013.01); *B41J 2/2117* (2013.01); *B41J 11/0022* (2021.01)

(58) Field of Classification Search

CPC ...... B41J 3/4078; B41J 2/2117; B41J 11/0022

See application file for complete search history.

(56) References Cited

U.S. PATENT DOCUMENTS

| | | | | |
|---|---|---|---|---|
| 2006/0092192 | A1* | 5/2006 | Vo | B41J 11/0022 347/2 |
| 2019/0176378 | A1* | 6/2019 | Hehn | B32B 27/32 |
| 2021/0221157 | A1* | 7/2021 | Schwendimann | B41J 2/0057 |
| 2022/0305831 | A1* | 9/2022 | Wegzyn | B41F 15/40 |

* cited by examiner

*Primary Examiner* — Bradley W Thies

(74) *Attorney, Agent, or Firm* — Kenneth C. Booth; Booth Udall, PLC

(57) ABSTRACT

An inkjet printer with an additional adhesive inkjet is disclosed. The printer may print, using an inkjet printer, a conductive ink on a film. The printer may print an adhesive on the conductive ink. The film may be applied to a textile. The film may be heated to transfer the image to the textile.

19 Claims, 2 Drawing Sheets

INKJET PRINTER WITH ADDITIONAL ADHESIVE JET

RELATED APPLICATIONS

This application is a continuation-in-part of U.S. patent application Ser. No. 18/445,443, filed Aug. 21, 2023, to Breazeale et al., titled, "Inkjet Composition and Method for Applying the Same," and of U.S. patent application Ser. No. 18/445,939, filed Apr. 4, 2024, to Breazeale et al., titled "Flex Printer-Bracket Assembly," and of U.S. patent application Ser. No. 18/445,941, filed Apr. 4, 2024, to Breazeale et al., titled "Printer Dryer", and also of U.S. patent application Ser. No. 18/831,035, filed May 8, 2024, to Breazeale et al., titled "Method and apparatus for direct to film and direct to print," and claims the benefit of U.S. Provisional Application No. 63/474,551, filed Aug. 22, 2022, to Breazeale et al., titled, "Inkjet Composition and Method for Applying the Same," the entirety of each disclosure is hereby incorporated into this application by reference.

TECHNICAL FIELD

This document relates to inkjet printers with an additional adhesive jet. Inkjet compositions can be used to create images and graphics on textiles.

BACKGROUND

Clothing has become more expressive and customizable. Consumers want the option of printing custom logos or designs on textiles, such as shirts and hoodies. Consumers want to print reliably at low cost and high speed.

SUMMARY

According to some embodiments, a method of printing an image on a textile includes printing, using an inkjet printer, a conductive ink on a film. The method may include printing, using the inkjet printer, an adhesive layer on the conductive ink. The film is then applied to a textile with the adhesive layer contacting the textile. In some embodiments, heat is applied to the film. The heat adheres the adhesive layer to the textile. When the film is removed, the ink remains attached to the textile because it is adhered to the adhesive. In some embodiments, the method includes pre-treating the textile with a pre-treatment solution that includes a polyvalent metal salt and an aqueous medium. In some embodiments, components of the conductive ink include conductive particles, a binder, a solvent, and a thickener. In some embodiments, 40% of the conductive ink is made from conductive particles, 30% binders, 3% solvents, and 3% thickeners.

In some embodiments, a method of printing on a textile includes providing a film. The film has a PET film layer and a first wax layer disposed on the PET film layer. A second wax layer may be disposed on the first wax layer. In some embodiments, an inkjet printer is used to print ink on the second wax layer. In some embodiments, the melting point of the first wax layer is greater than the melting point of the second wax layer. In some embodiments, the ink is printed at a temperature greater than a melting point of the second wax layer but lower than a melting point of the first wax layer. In some embodiments, the method includes printing, using an inkjet printer, an adhesive layer on the ink.

In some embodiments, the inkjet printer comprises three print heads. The first print head is configured to print white ink. The second print head may be configured to print color ink. For example, this may be any individual color or a set of colors. For example, the color head may print CMYK (standing for Cyan, Magenta, Yellow, and Black, respectively). The third print head may be configured to print an adhesive. The first print head and the second print head may be configured to print ink with a viscosity of 3 picoliters. In some embodiments, the third print head may be configured to print an adhesive with a viscosity of 5 picoliters. In some embodiments, the adhesive includes an activator. The activator is configured to dry when printed and is configured to improve the adhesiveness of the adhesive to the textile when heated on the textile. In some embodiments, the first, second, and third print heads are piezoelectric inkjet heads.

In some embodiments, an inkjet printer includes a white inkjet print head, a color inkjet print head, and an adhesive inkjet print head. In some embodiments, each of the inkjet print heads are piezoelectric inkjet heads. In some embodiments, an adhesive dispensed by the adhesive inkjet print head is more viscous than the ink dispensed by the color inkjet print head. The color inkjet print head may be configured to dispense ink with a viscosity of 3-5 picoliters. In some embodiments, the adhesive inkjet print head is configured to dispense an adhesive with a viscosity between about 5-9 picoliters.

BRIEF DESCRIPTION OF THE DRAWINGS

Implementations will hereinafter be described in conjunction with the appended and/or included DRAWINGS.

DETAILED DESCRIPTION

Figure 1:
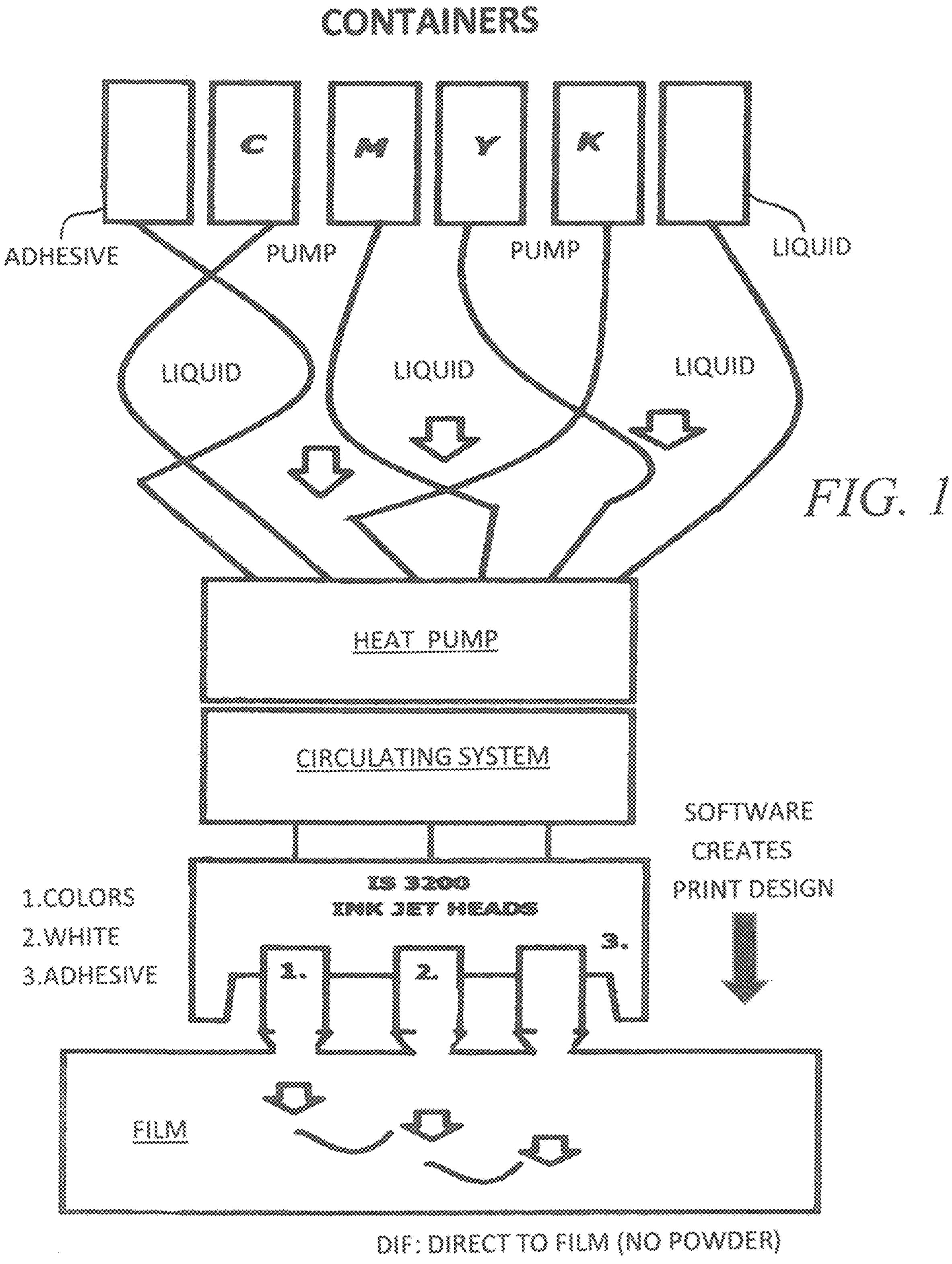
FIG. 1 shows a schematic of an inkjet printer according to some embodiments.

Detailed aspects and applications of the disclosure are described below in the following drawings and a detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Adding images to textiles allows artists and businesses to convey their messages to a wide variety of people. However, printing images on textiles presents unique challenges. For example, specialty inks are often required to adhere to the textiles. Additionally, various expensive types of printers are often required to handle the specialized ink.

The present disclosure is directed to an inkjet printer with an additional adhesive head. The inkjet printer uses conventional printing heads to print inkjet images on a film. The inkjet printer also uses a conventional printing head to print an adhesive on the ink. The image can be transferred from the film to the textile using a heat transfer method. The heat transfer method adheres the adhesive and ink to the textile.

FIG. 1 shows a schematic of a printer according to some embodiments. As shown in FIG. 1, the printer has five containers. From left to right, the containers are an adhesive container, a Cyan ink container, a Magenta ink container, a Yellow ink container, a Black ink container, and a liquid container. The adhesive container holds an adhesive. The liquid container may contain additional liquids for use during the printing process. For example, the liquid container may contain an activator. The activator is a compound that improves the adhesion of the adhesive to the textile. In some embodiments, the activator is heat-activated. This makes the activator particularly useful when heat is applied to the film to apply the image to the textile.

In some embodiments, the adhesive includes an activator that dries when printed. The activator also aids in the drying of the adhesive. In some embodiments, the activator can be printed separately from the adhesive. For example, the inkjet printer may include a fourth inkjet head to print the activator on the adhesive. In some embodiments, the activator is mixed with the adhesive just prior to printing, and the adhesive is printed with the activator. Not only does the activator aid in drying the adhesive, but it also can increase the adhesion of the adhesive to a textile when the film is heated against the textile. In some embodiments, inkjet heads are used. Unlike jetting heads, which use air pressure much like a paint sprayer, inkjet heads lead to less drying of the ink as it is applied to the film. If the ink is too dry when it is applied to the film, the ink may not cure properly and may crack and become brittle during print jobs.

As shown in FIG. 1, the containers are fluidly coupled to a circulating system. The contents of each container are pumped into the circulating system by pumps. The circulating system is operatively coupled to a heat pump. The heat pump is used to closely control the temperature of the fluids in the circulating system. For example, the heat pump and the circulating system may be configured to keep the ink at one temperature and an adhesive at a second temperature. The circulating system is fluidly coupled to inkjet heads.

In some embodiments, such as the one shown in FIG. 1, the inkjet printer may comprise three inkjet heads. The print heads include a CMYK (or color) inkjet print head, a white inkjet print head, and a liquid adhesive inkjet print head. In some embodiments, the inkjet printer has more print heads. For example, the CMYK print head may be split into four print heads, one for each color.

An advantage of the current invention is that it can include many traditional off-the-shelf printer components. For example, the ink jet head may be an Epson™ IS 3200. This standard-size inkjet head can handle a viscosity of 3-5 picoliters. This is sufficient for printing CMYK and white inks. However, when printing an adhesive, an Epson™ IS 3200 U1 may be used. This print head can handle viscosities of 5-9 picoliters. When printed, the adhesive creates a dome over the ink. This is because the adhesive is thick and viscous, so it does not spread out over the ink once placed on the ink.

As shown in FIG. 1, the inkjet heads print an image on a film in accordance with instructions received by software that creates the print design. In some embodiments the ink jet head is a piezoelectric inkjet head. The piezoelectric inkjet head elements are used to create ink markings where an electric current is applied to the piezoelectric elements. The applied current causes a slight expansion of the piezoelectric elements, which forces ink (or an adhesive) out of the inkjet head nozzle. This contrasts with a jetting head which uses air to push ink out of the nozzle and tends to dry the ink as the air pushes the ink out and is not conducive to use with film-printed transfers of the kinds discussed herein. The piezoelectric inkjet head can produce more precise droplet sizes, which improves image quality and allows them to be used with specialized inks and does not additionally dry the ink from additional air being blown. The piezoelectric inkjet head can also handle the adhesive. In addition to the Epson™ IS 3200 print head, other print heads contemplated to be used are the DX-4, DX-5, DX-7, the I3200, the I 3200 S, as well as any other piezoelectric printheads from Epson™ or any other company.

Figure 2:
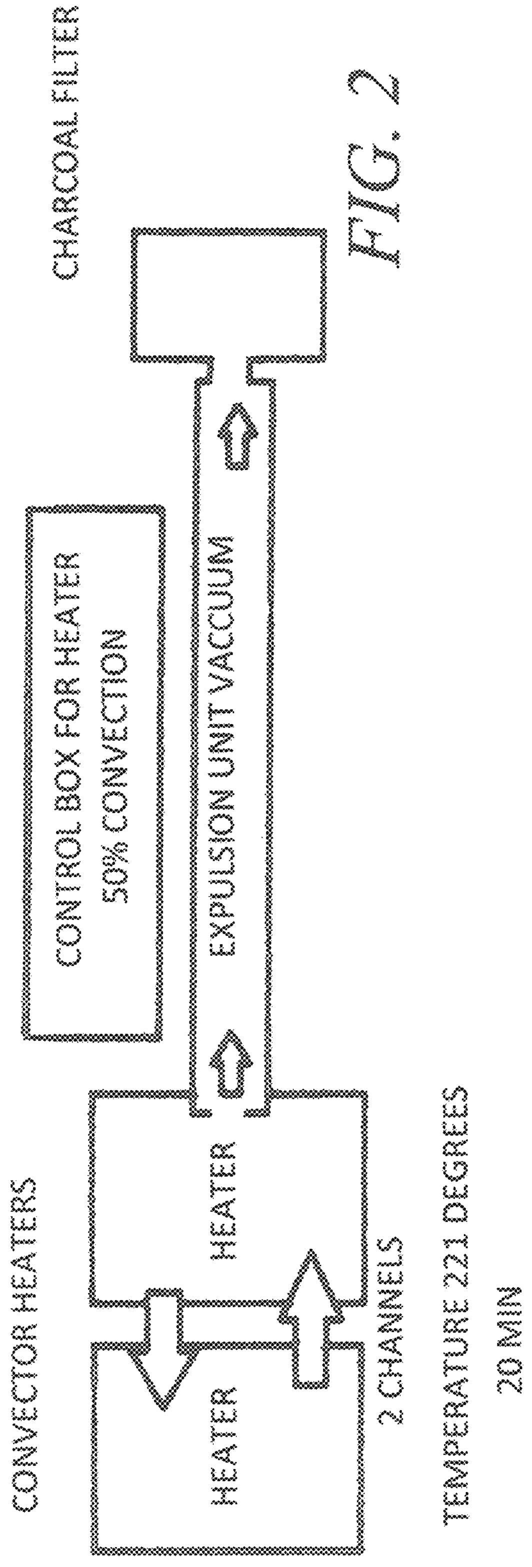
FIG. 2 shows a schematic of an embodiment of a heating system for use with an inkjet printer.
Figure 3:
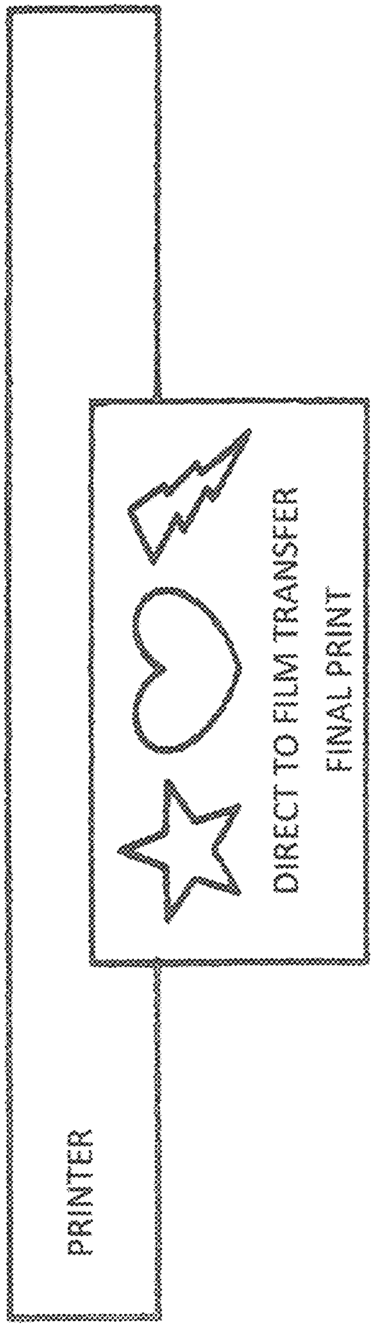
FIG. 3 shows a schematic of an embodiment of a printer according to some embodiments.

FIG. 2 shows a schematic of the interface between the heat pump and the circulating system. The heat pump uses a two-channel heater that heats the ink before it is expelled through the expulsion unit vacuum, through a charcoal filter, and out through the inkjet head. The expulsion unit vacuum is surrounded by a conventional heater that is used to finely control the temperature of the fluid as it moves through the expulsion unit vacuum. FIG. 3 shows the printer printing a final print on the film, which is used to transfer the image to the textile.

In some embodiments, the composition of the ink in the inkjet printer may include conductive particles, a binder, a solvent, and a thickener. In some embodiments, the conductive ink includes between 40 and 60% conductive particles, between 30 and 50% binder, between 3% and 7% solvent, and between 3% and 7% thickener. In some embodiments, the conductive particles may attract the adhesive. This improves the adhesion of the ink to the adhesive. This, in turn, improves the adhesion of the ink to the textile. In some embodiments, the entire inkjet printing process occurs without powders. This reduces the environmental and safety concerns common when printing with powders. In some embodiments, the ink does not react with a deoxidizing material, zinc, or aluminum.

In some embodiments, the printed image uses a direct-to-film process. The transfer process involves heating and pressing the ink in the adhesive on apparel or any promotional product. In some embodiments, the transfer processes heating component may be done by an iron or other hot object.

In some embodiments, the inkjet printer prints an image onto a film. The inkjet printer first prints the colors on the film. Then, if necessary, the inkjet printer prints white on the film. Lastly, the inkjet printer prints the adhesive onto the colors in the white of the film. The adhesive is the layer used to adhere the image to the clothing, or other textile, through a heat transfer process.

In some embodiments, the film is a polyethylene terephthalate ("PET") film. In some embodiments, the PET film is a biaxially oriented polyethylene terephthalate. The PET film is coated with a wax layer. Additional layers of wax coating can be used. For example, in a typical print, three to five layers of wax are used. The ink layers are printed on top of the wax layers. Each layer of ink uses one of the layers of wax. So, for example, an image that uses cyan, white, and an adhesive may have three wax layers. The cyan layer may be printed first, followed by the white layer, followed by the adhesive. Because the ink released by the piezoelectric print head is warm, it will slightly melt the wax of each layer when the ink is deposited on the wax. This restricts the ink from spreading or bleeding. It also optimizes print quality and reduces the likelihood that the film sticks to the printer rolls during the printing process. Generally, it is better to have one more layer of wax than the number of ink layers being placed on the film. In addition to preventing spreading or bleeding, the wax layer also provides an initial tackiness to hold the ink during the printing process. The wax layer also facilitates the clean removal of the film when the film is heat-pressed on the textile.

In some embodiments, the textile piece is preliminarily treated with a treatment solution containing a water-soluble polyvalent metal salt and an aqueous medium to obtain a fixation property and increase the durability of the ink. In some embodiments, this may dry the textile piece.

In some embodiments, the textile piece may include cotton, silk, hemp, rayon, acetate, nylon or polyester fibers or it may be a textile piece including at least two of the fibers previously mentioned.

This disclosure, its aspects, and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

It will be understood that implementations of the inkjet printer with an additional adhesive jet include but are not limited to the specific components disclosed herein, as virtually any components consistent with the intended operation of various inkjet printer with an additional adhesive jet may be utilized.

The concepts disclosed herein are not limited to the specific inkjet printer with an additional adhesive jet shown herein. For example, it is specifically contemplated that the components included in a particular inkjet printer with an additional adhesive jet may be formed of any of many different types of materials or combinations that can readily be formed into shaped objects and that are consistent with the intended operation of the inkjet printer with an additional adhesive jet.

Furthermore, inkjet printers with an additional adhesive jet may be manufactured separately and then assembled together, or any or all of the components may be manufactured simultaneously and integrally joined with one another. Manufacture of these components separately or simultaneously, as understood by those of ordinary skill in the art, may involve 3-D printing, extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular inkjet printers with additional adhesive jets, it should be readily apparent that a number of modifications may be made without departing from the spirit thereof and that these implementations may be applied to other implementations disclosed or undisclosed. The presently disclosed inkjet printer with an additional adhesive jet are, therefore, to be considered in all respects as illustrative and not restrictive.

What is claimed is:

1. An inkjet printer for direct to film printing for textile transfer, the inkjet printer comprising:
- an input transport assembly configured to receive a continuous film and advance the film along a print path to a print head assembly;
- a print head assembly comprising:
  - a white inkjet print head configured to dispense ink;
  - a Cyan, Magenta, Yellow, and Black inkjet print head configured to dispense ink with a viscosity of 3-5 picoliters; and
  - an adhesive inkjet print head configured to dispense an adhesive and an activator with a viscosity between about 5-9 picoliters onto the continuous film, the activator configured to dry when printed and configured to improve the adhesiveness of the adhesive to a textile when heated on the textile; and
- a heat pump and a circulating system fluidly coupling adhesive and ink storage containers to the print head assembly, wherein the heat pump and circulating system together are configured to control a temperature of the inks and a temperature of the adhesive prior to the inks and the adhesive being dispensed from the print head assembly;

an exit transport assembly, the exit transport assembly configured to advance the continuous film from the print head assembly to a heater assembly, wherein the heater assembly comprises:

a heater, the heater configured to heat the film after ink and adhesive are printed to the continuous film;

a blower fan configured to circulate air over the continuous film;

a blower motor configured to drive the blower fan; and a fume box assembly, the fume box assembly comprising a fume funnel fluidly coupled to the heater assembly and a fume suction tube fluidly coupled to the fume funnel.

2. The inkjet printer of claim 1, wherein white and the Cyan, Magenta, Yellow, and Black inkjet print heads are piezoelectric inkjet print heads.

3. The inkjet printer of claim 1, wherein the adhesive inkjet print head is a piezoelectric inkjet print head.

4. The inkjet printer of claim 1, wherein the ink dispensed by the inkjet print is a conductive ink.

5. The inkjet printer of claim 1, wherein the film has a polyethylene terephthalate ("PET") film layer, a first wax layer disposed on the PET film layer, and a second wax layer disposed on the first wax layer, wherein a melting point of the first wax layer is greater than a melting point of the second wax layer, and wherein the ink is printed at a temperature greater than a melting point of the second wax layer and less than a melting point of the first wax layer.

6. The injet printer of claim 1, wherein the heat pump and circulating system together are further configured to control the temperature of the inks at a first temperature and the temperature of the adhesive at a second temperature different from the first temperature.

7. An inkjet printer for direct to film printing for textile transfer, the inkjet printer comprising:

a white inkjet print head configured to print white ink onto a film for use in transferring the ink to a textile item;

a cyan, magenta, yellow, and black inkjet print head configured to print any of cyan, magenta, yellow and black ink onto the film to enable transferring the ink to the textile item;

an adhesive print head, the adhesive print head configured to print an adhesive on top of any of the white, cyan, magenta, yellow, and black inks to enable transferring the adhesive and ink to the textile item; and a heat pump configured to control a temperature of the white, cyan, magenta, yellow and blank inks and a temperature of the adhesive prior to transferring the inks and transferring the adhesive to the textile item.

8. The inkjet printer of claim 7, further comprising an input transport assembly configured to receive a PET film and advance the PET film to the inkjet and adhesive print heads.

9. The inkjet printer of claim 7, further comprising an exit transport assembly configured to advance the film from the inkjet and adhesive print heads.

10. The inkjet printer of claim 7, further comprising a heater assembly.

11. The inkjet printer of claim 10, wherein the heater assembly is configured to heat a PET film after ink is printed on the PET film.

12. The inkjet printer of claim 10, wherein the heater assembly comprises a blower fan configured to circulate air over a PET film.

13. The inkjet printer of claim 10, wherein the adhesive print head is a piezoelectric inkjet print head.

14. The inkjet printer of claim 10, wherein the cyan, magenta, yellow, and black inkjet print head is configured to dispense ink with a viscosity of 3-5 picoliters and the adhesive print head is configured to dispense an adhesive with a viscosity between about 5-9 picoliters.

15. The inkjet printer of claim 7, the adhesive further comprising an activator, the activator configured to dry when printed and configured to improve the adhesiveness of the adhesive to a textile when heated on the textile.

16. The injet printer of claim 7, wherein the heat pump is further configured to control the temperature of the inks at a first temperature and the temperature of the adhesive at a second temperature different from the first temperature.

17. A method of printing on a film through direct to film printing for textile transfer using an inkjet printer, the method comprising:

printing, using an inkjet printer, ink on a polyethylene terephthalate ("PET") film;

printing, using the inkjet printer, an adhesive on the ink; and controlling a temperature of the ink and a temperature of the adhesive prior to printing the ink and printing the adhesive;

wherein the inkjet printer comprises:

an input transport assembly configured to receive PET film and advance the PET film to a print head assembly;

a print head assembly comprising:

a white inkjet print head configured to dispense ink onto the PET film;

a cyan, magenta, yellow, and black inkjet print head configured to dispense ink onto the PET film; and an adhesive inkjet print head configured to dispense an adhesive and an activator, the activator configured to dry when printed and configured to improve the adhesiveness of the adhesive to a textile when heated on the textile; and the heat pump and the circulating system fluidly coupled to the print head assembly and configured to control the temperature of ink and the temperature of adhesive; and an exit transport assembly, the exit transport assembly configured to advance the film from the print head assembly to a heater assembly;;

wherein the heater assembly comprises:

a heater, the heater configured to heat the PET film after ink is printed to the PET film;

a blower fan configured to circulate air over the PET film;

a blower motor configured to drive the blower fan; and a fume box assembly, the fume box assembly comprising a fume funnel fluidly coupled to the heater assembly and a fume suction tube fluidly coupled to the fume funnel.

18. The method of claim 17, further comprising:

wherein the PET film is applied to the textile with the adhesive contacting the textile, wherein the PET film is applied to the textile using heat, and wherein the conductive ink remains attached to the textile by the adhesive when the PET film is removed.

19. The inkjet printer of claim 17, wherein the heat pump and circulating system together are further configured to control the temperature of the inks at a first temperature and the temperature of the adhesive at a second temperature different from the first temperature.

* * * * *